United States Patent [19]

Jordan

[11] 4,353,170
[45] Oct. 12, 1982

[54] APPARATUS FOR POSITIONING A WORKPIECE

[75] Inventor: Armin Jordan, Zurich, Switzerland

[73] Assignee: Werkzeugmaschinenfabrik Oerlikon-Bührle AG, Zurich, Switzerland

[21] Appl. No.: 207,657

[22] Filed: Nov. 17, 1980

[30] Foreign Application Priority Data

Dec. 4, 1979 [CH] Switzerland ............... 10764/79

[51] Int. Cl.³ .............................................. G01B 7/28
[52] U.S. Cl. ............................. 33/174 TA; 33/174 L; 33/179.5 R
[58] Field of Search ............. 33/169 R, 174 P, 174 L, 33/174 TC, 1 M, 1 AA, 179.5 R, 179.5 D, 174 TA

[56] References Cited

U.S. PATENT DOCUMENTS

| | | | |
|---|---|---|---|
| 2,376,303 | 5/1945 | Woytych et al. | 29/26 |
| 3,270,423 | 9/1966 | Birrell et al. | 33/174 TA |
| 3,509,635 | 5/1970 | Meinke | 33/174 L |
| 4,182,045 | 1/1970 | Bosch et al. | 33/179.5 R |
| 4,297,788 | 11/1981 | Sterki et al. | 33/179.5 R |

FOREIGN PATENT DOCUMENTS

| | | |
|---|---|---|
| 1247807 | 8/1967 | Fed. Rep. of Germany. |
| 772514 | 8/1934 | France. |
| 938947 | 2/1962 | United Kingdom. |
| 2000867 | 1/1979 | United Kingdom. |

OTHER PUBLICATIONS

"Tape-Controlled 'Inspector' Measures In Six Axes", *American Machinist* Publication Dated Feb. 9, 1959.

*Primary Examiner*—Willis Little
*Attorney, Agent, or Firm*—Werner W. Kleeman

[57] ABSTRACT

An apparatus for positioning a workpiece comprises four measuring devices which collectively render possible the fabrication of a continuous bore at a workpiece. One part of the bore is produced from one side or face of the workpiece and the other part of the bore from the opposite side or face of the workpiece and both parts of the bore are in alignment with one another. The first measuring device serves to enable rotating a rotatable table through any desired angle, the second measuring device for enabling displacing a slide through any desired amount in the X-direction. According to the invention the third measuring device serves for the exact positioning of the rotatable table at 0°, 90°, 180° and 270°. Finally, the fourth measuring device ensures that the rotatable table and a work spindle axis precisely intersect.

6 Claims, 6 Drawing Figures

APPARATUS FOR POSITIONING A WORKPIECE

BACKGROUND OF THE INVENTION

The present invention relates to a new and improved construction of an apparatus for positioning a workpiece at a machine tool, especially a horizontal drilling machine having a work spindle.

Different constructions of apparatuses for adjusting or positioning machine tool parts are known, as exemplified for instance by British Pat. Nos. 938,947, 2,000,867, French Pat. No. 772,514, U.S. Pat. No. 2,376,303 and German Pat. No. 1,247,807.

According to the invention the workpiece positioning apparatus is of the type wherein the work spindle is displaceable upon a first slide or carriage in the Y-direction, there is provided a rotatable table which is displaceable upon a second slide in the X-direction, and in the starting position of the second slide the axis of the rotatable table intersects the axis of the work spindle. Also there is provided a first measuring device for enabling rotating the rotatable table through any desired rotational angle and a second measuring device for enabling displacing the rotatable table through any desired amount in the X-direction.

It has been found that for certain tasks the aforementioned two measuring devices at horizontgal drilling machines do not fulfill the prevailing requirements. This is particularly the case if there should be produced at a workpiece a continuous bore, and part of the bore is to be produced from one side or face of the workpiece and the other part of the bore from the opposite side or face of the workpiece and both parts of the bore should be in alignment with one another. In particular, there is not ensured that with the aid of the second measuring device the slide can be displaced in such a manner into its starting position that the work spindle axis and the axis of the rotatable table do in fact intersect.

With the aforementioned two measuring devices for positioning a workpiece it is therefore not possible, without resorting to the aid of additional measuring devices, to align the aforementioned parts of the bore during the drilling operation with respect to one another such that both bore parts are in exact alignment.

SUMMARY OF THE INVENTION

Therefore, with the foregoing in mind it is a primary object of the present invention to provide a new and improved construction of apparatus for positioning a workpiece in a manner not associated with the aforementioned drawbacks and limitations of the prior art proposals.

Another and more specific object of the present invention aims at providing a new and improved construction of workpiece positioning apparatus wherein both parts of a bore can be aligned with a desired degree of accuracy with respect to one another.

Still a further significant object of the present invention aims at providing a new and improved construction of apparatus for positioning a workpiece so as to enable drilling a bore in the workpiece from opposite sides or faces thereof and aligning both of the drilled portions of the bore in an extremely reliable, accurate and expedient fashion.

Now in order to implement these and still further objects of the invention, which will become more readily apparent as the description proceeds, the apparatus of the present development is manifested by the features that there is provided a third measuring device by means of which it is possible to adjust individual angles, especially 0°, 90°, 180° and 270°, more accurately than with the first measuring device. Additionally, a fourth measuring device is provided by means of which, in conjunction with the second measuring device, the axis of the rotatable table can be adjusted in relation to the work spindle axis at the common intersection point.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
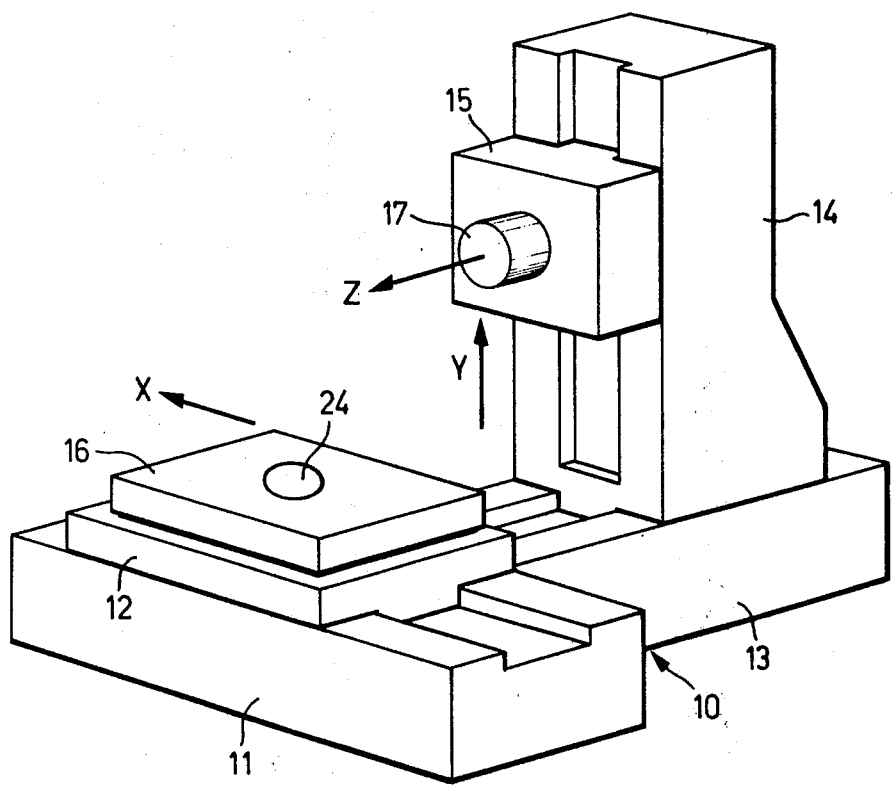
FIG. 1 is a perspective view of a horizontal drilling machine according to the invention.

Describing now the drawings, according to FIG. 1 there is shown an exemplary embodiment of horizontal drilling machine which will be seen to comprise a substantially T-shaped machine bed 10. At the front portion 11 of the machine bed 10 there is located a first slide or carriage 12 and at the rear portion 13 of such machine bed 10 there is located a displaceable stand 14 at which there is vertically displaceable a second slide or carriage 15. Upon the first slide 12 there is mounted for rotation about a substantially vertical axis a rotatable table 16 and there is rotatably mounted at the second slide 15 a work spindle 17 for rotational movement about a horizontal axis. As indicated by the arrow X the first slide 12 can be displaced in the X-direction and as likewise indicated by the arrow Y the second slide 15 can be displaced in the Y-direction. There is also illustrated a Z-axis by the arrow Z and such coincides with the axis of the work spindle 17.

Figure 2:
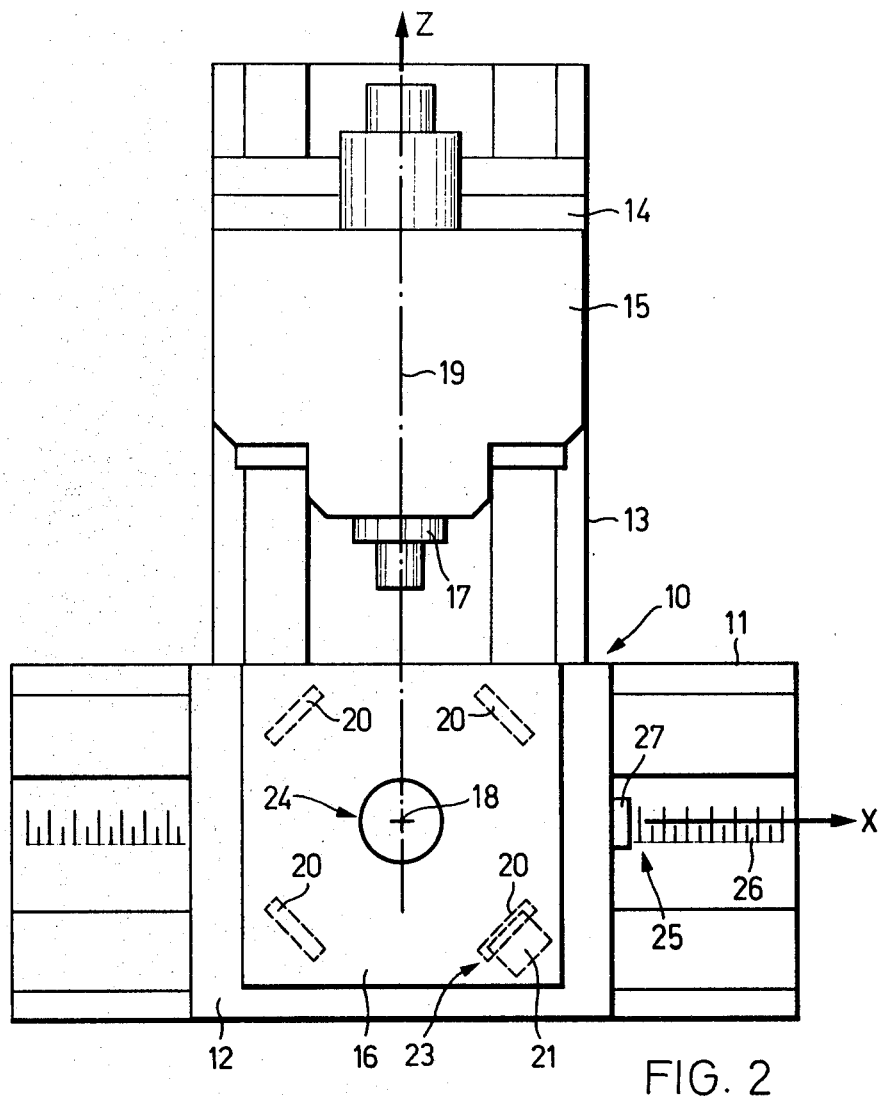
FIG. 2 is a top plan view of the machine shown in FIG. 1.

As best seen by referring to FIG. 2, an axis 18 of the rotatable table 16 intersects an axis 19 of the work spindle 17 when the slide 12 is shifted at the front portion 11 of the machine bed 10 in the X-direction into its starting position.

Figure 3:
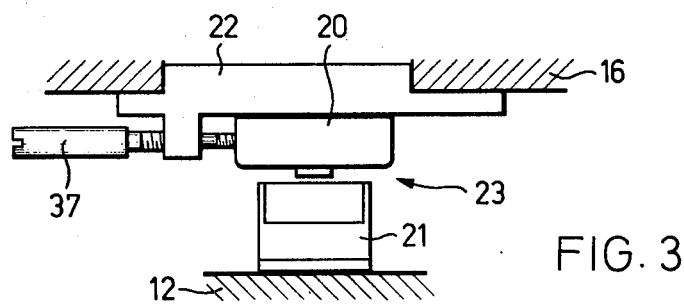
FIG. 3 illustrates a measuring device of such machine in side view.

At the underside of the rotatable table 16 there are attached, as best seen by referring to FIGS. 2 and 3, four measuring value transmitters 20, and additionally, there is secured at the first slide 12 a measuring value sender 21. The measuring value transmitter 20 is arranged to be displaceable upon a support or carrier 22 and can be shifted with the aid of an adjustment screw 37 or equivalent position adjusting structure. This adjustment screw 37 is provided, in known manner, with two threads having different pitch, so that there can be undertaken an extremely exact positioning of the measuring value transmitter 20 with the aid of the adjustment screw 37. The four measuring value transmitters 20 are arranged at the four corners of the rectangular or quadratic table 16, so that the spacing from the rotatable table axis 18 is as large as possible since the accuracy of an angular measurement is essentially dependent upon this spacing. Both the construction of the measuring value transmitter 20 and also the construction of the measuring value sender 21 is known and therefore need not here be further described. With the aid of the measuring device 23, composed of the four measuring value transmitters 20 and the single measuring value sender 21, it is possible to enable rotating the rotatable table 16 in each case through 90° with the desired accuracy. Since however any other angle cannot be adjusted with this measuring device 23 there is additionally arranged a further known measuring device 24 at the center of the rotatable table 16. This additional measuring device 24, by means of which there is enabled rotating the rotatable table 16 through any random angle, has only been schematically represented in the drawing by a circle. Since by means of this measuring device 24 it is possible to carry out measurements relatively close to the rotational axis 18, the accuracy of the measurement is less exact because of the smaller spacing between the measuring device 24 and the rotational axis 18.

With the described two measuring devices 23 and 24 it is possible to considerably more accurately measure the four angles 0°, 90°, 180° and 270° than the remaining intermediate angles. Such combination of two measuring devices 23 and 24 is appreciably less expensive than a single measuring device where there can be adjusted all angles with greater accuracy.

To enable displacing the slide in the X-direction there is also arranged a further measuring device 25 which consists of a measuring rod 26 secured at the front part 11 of the machine bed 10 and a measuring value sender 27 attached at the first slide 12, wherein the measuring rod 26 constitutes a measuring value transmitter. Also this measuring device 25 is of known construction and therefore need not here be further explained. Preferably, the measuring rod 26 is arranged such that with the starting position of the first slide or carriage 12, i.e. when the rotatable table 18 and the work spindle axis 19 intersect the measuring value sender 27 indicates the value "0" (null).

Figure 4:
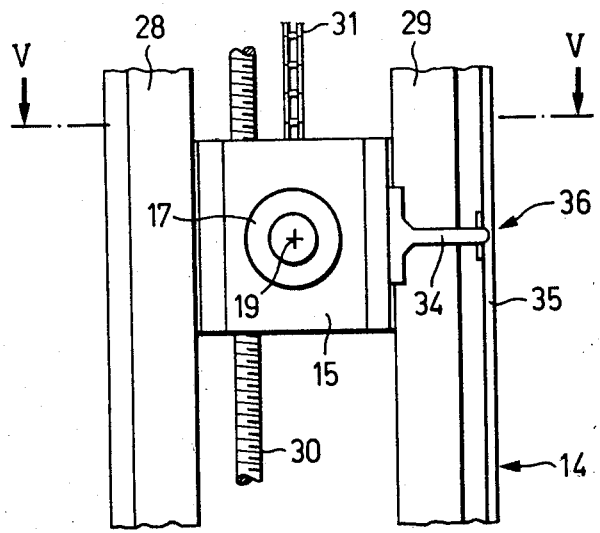
FIG. 4 is a view of the headstock and part of a related stand.
Figure 5:
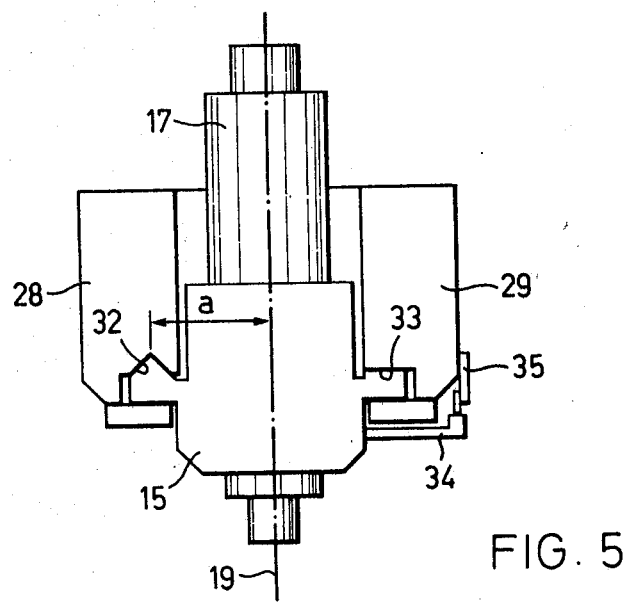
FIG. 5 is a sectional view of the arrangement of FIG. 4. taken substantially along the line V—V thereof.

According to the showing of FIGS. 4 and 5 the stand 14 possesses two rails 28 and 29, between which there is located the second slide 15 possessing the work spindle 17. The rails 28 and 29 also can be construed as columns and the second slide 15 also is designated as a headstock. For raising and lowering the second slide 15 there is provided a ball spindle 30. The slide 15 is connected by means of a load relieving chain 31, which is guided over a not particularly illustrated deflection roll arranged at the upper end of the stand 14, with a not here further illustrated counter weight for load relieving the ball spindle 30. The second slide 15 is guided upon the one rail 28 in a substantially V-shaped groove 32 and at the other rail 29 is guided at a guide surface 33, as best seen by referring to FIG. 5.

According to the showing of FIGS. 4 and 5 there is attached to the second slide 15 a further measuring value sender 34 which coacts with a measuring value transmitter 35. This measuring value transmitter 35, in the form of a precision linear rod, is attached at the rail 29. The measuring device 36, consisting of the measuring value sender 34 and the measuring value transmitter 35, serves the purpose of indicating displacements of the work spindle axis 19 in the X-direction and for controlling the machine. Such displacements of the work spindle axis 19 in the X-direction arise because of different reasons. In particular, heating of the slide 15 causes such displacement in the X-direction, since the V-shaped groove 32 is arranged at the distance a (FIG. 5), viewed in the X-direction, from the axis 19. If the slide or carriage 15 elongates or expands, then the axis 19 shifts to the right of FIG. 5. Additionally, the rail 28 is practically not exactly vertical dispositioned. This has the result that with a displacement of the slide 15 in the Y-direction there cannot be avoided a migration of the axis 19 in the X-direction, i.e. to the right or left of FIG. 1.

With the aid of the last described measuring device 36 it is possible to measure this displacement of the work spindle axis 19 in the X-direction. The measurement result is used for the purpose of displacing the first slide 12 through the measured amount in the X-direction, so that the rotatable table axis 18 and the work spindle axis 19 again intersect at a common point.

The measuring device 36 is again to be construed as being known and therefore need not here be further explained. Preferably, the measuring value sender 34 is constructed exactly the same as the heretofore described measuring value sender 21. The measuring value transmitter 35 in the form of a rod preferably consists of a number of sections arranged in spaced relationship from one another in a plane. For very exact measurements this rod can be replaced by a light beam (laser beam).

Figure 6:
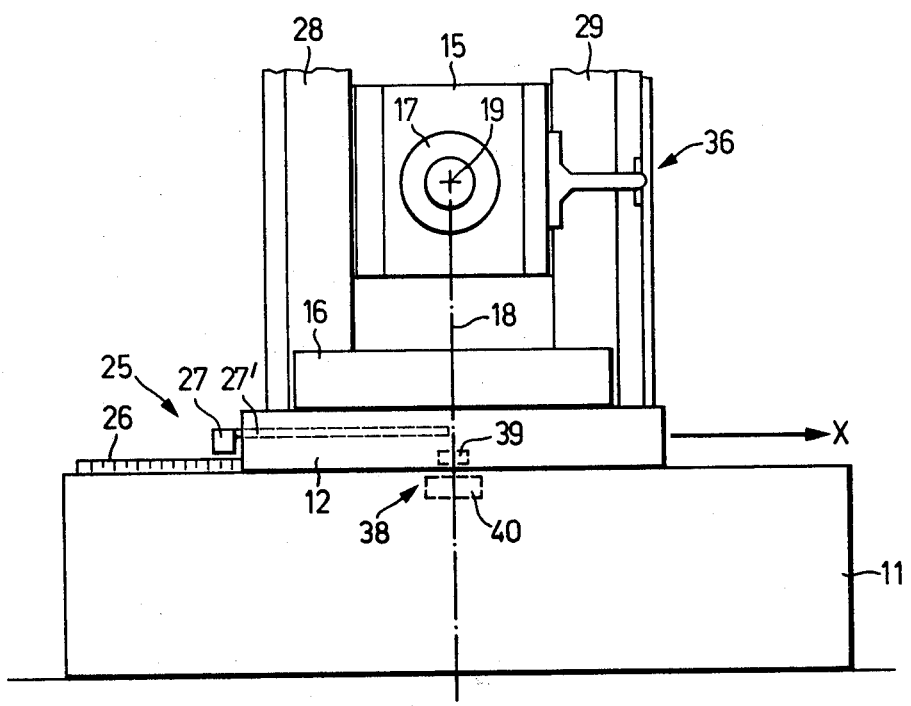
FIG. 6 is a front view of the machine.

According to FIG. 6 there is provided still a fifth measuring device 38 which is constructed in the same manner as the fourth measuring device 36 from a measuring value transmitter 39 and a measuring value sender 40. The measuring value transmitter 39 is attached at the slide 12 and the measuring value sender 40 is secured at the front portion or part 11 of the machine bed 10. Both the measuring value transmitter 39 and also the measuring value sender 40 are arranged exactly at the rotational axis 18 of the rotary or rotatable table 16 and indicate the value "0" when the rotary table axis 18 and the work spindle 19 intersect, as indicated in FIG. 6.

In this position of the slide 12 at the front portion or part 11 of the machine bed 10 also the measuring device 25 indicates the value "0", i.e. the measuring value sender 27 is located exactly over the null position of the measuring rod 26. Preferably, the measuring value sender 27 according to the showing of FIG. 6 is secured with the aid of a glass rod 27' at the region of the rotatable table axis 18 at the slide 12. The glass rod 27' possesses a small coefficient of thermal expansion and therefore ensures for extreme accuracy.

Both of the measuring devices 36 and 38 are connected with a not here further described but conventional numerical control device which ensures that during each displacement of the work spindle axis 19 in the X-direction the first slide 12 is shifted by the same amount, so that the rotational table axis 18 again intersects the work spindle axis 19. Preferably, in this position the one measuring device 36 displays, for instance, a positive value and the other measuring device 38 an exactly equal magnitude negative value in a manner such that both of the values or magnitudes cancel one another in the control device, i.e. commonly display the value null or "0". Thus, if the rotatable table axis 18 and the work spindle axis 19 intersect then there is displayed in the control device the value "0".

In summation there are thus arranged the following four measuring devices at the horizontal drilling machine:

(a) the first measuring device 24, serving for enabling rotating the rotatable table 16 through each desired angle, (b) the second measuring device 25, serving for enabling displacing the first slide 12 along with the rotatable table 16 through each desired amount in the X-direction, (c) the third measuring device 23 by means of which it is possible to adjust individual angles, especially 0°, 90°, 180° and 270° more accurately than with the first measuring device 24, and (d) a fourth measuring device 36, which measures the mentioned starting position of the first slide 12 in relation to the work spindle 17 by means of which it is possible to adjust the rotatable table axis 18 in relation to the work spindle axis 19 by means of the second measuring device 25 at the common intersection point.

The mode of operation of the described apparatus for positioning a workpiece at a machine tool is as follows: There should for instance be bored at a relatively large housing, at two oppositely situated walls thereof, a respective bore, and both of these bores should be in alignment with one another, i.e. the axes of both bores should coincide. So that both of the bore axes coincide there must be fulfilled two conditions:

(a) both of the bore axes must have exactly the same direction in the housing, and (b) both of the bore axes should not be offset with respect to one another.

With a relatively large housing it is not possible to fabricate both bores in one working operation, and this means: after the drilling or boring of the first bore the workpiece must be exactly rotated through 180° with the aid of the rotatable table 16. For this exact rotation through 180° there is not sufficient the first measuring device 24. The rotation then can be carried out with the third measuring device 23.

If upon rotation of the workpiece through 180° the rotary table axis 18 and the work spindle axis 19 do not intersect at a point, then both of the bore axes are offset by a certain amount which is twice as great as the spacing between the rotary table axis 18 and the work spindle axis 19. The second measuring device 25 does not ensure that the work spindle axis 19 and the rotatable table axis 18 actually intersect. Therefore it is necessary to use the fourth measuring device 36.

While there are shown and described present preferred embodiments of the invention, it is to be distinctly understood that the invention is not limited thereto, but may be otherwise variously embodied and practiced within the scope of the following claims. Accordingly,

What I claim is:

1. An apparatus for positioning a workpiece which is to be machined upon a machine tool, especially a horizontal drilling machine, in order to produce a continuous bore at the workpiece, wherein part of the bore is machined from one side of the workpiece and the remaining part of the bore from the opposite side of the workpiece and following the machining operation both parts of the bore are in alignment with one another, comprising:

a rotatable table having an axis;

a first slide upon which said rotatable table is displaceable in an X-direction;

a second slide;

a work spindle having an axis;

said work spindle being displaceable upon said second slide in a Y-direction;

said first slide having a starting position at which the axis of the rotatable table intersects with the axis of the work spindle;

a first measuring device for enabling rotating the rotatable table through any desired angle;

a second measuring device for enabling displacing the rotatable table through any desired amount in the X-direction;

a third measuring device for enabling adjusting the individual angles of the rotatable table more exactly than by means of the first measuring device;

a fourth measuring device for measuring the starting position of the first slide in relation to the work spindle; and said fourth measuring device in conjunction with said second measuring device enabling adjustment of the axis of the rotatable table in relation to the axis of the work spindle at a common intersection point.

2. The apparatus as defined in claim 1, wherein:

said third measuring device comprises four measuring value transmitters;

said four measuring value transmitters being mounted so as to be substantially uniformly distributively arranged at the circumference of the rotatable table; and a measuring value sender which is secured at the first slide and cooperating with said four measuring value transmitters.

3. The apparatus as defined in claim 1, wherein:

a guide rail is provided for said second slide;

the fourth measuring device comprises a measuring value sender attached at the second slide and a measuring value transmitter which is secured in the form of a precision rod at said guide rail of the second slide.

4. The apparatus as defined in claim 1, further including:

a machine bed;

a fifth measuring device including a measuring value sender;

said measuring value sender being secured at the machine bed;

said fifth measuring device being further provided with a measuring value transmitter attached to the first slide; and said fifth measuring device being electrically coupled with said second measuring device in order to conjointly indicate a value null when the axis of the rotatable table and the axis of the work spindle intersect.

5. The apparatus as defined in claim 1, wherein:

said third measuring device enables more exact adjustment of the angles 0°, 90°, 180° and 270° of the rotatable table.

6. An apparatus for producing a continuous bore at a workpiece, wherein a part of the bore is machined from one side of the workpiece and the remaining part of the bore is machined from the opposite side of the workpiece and following the machining operation both parts of the bore are in alignment with one another, comprising:

a rotatable table having an axis;

a first slide displaceable in an X-direction supporting said rotatable table;
a work spindle having an axis;
a second slide displaceable in a Y-direction supporting said work spindle;
said first slide having a starting position at which the axis of the rotatable table intersects with the axis of the work spindle;
means for enabling accurate adjustment of predetermined individual angles of the rotatable table;
said accurate adjustment means comprising:
  a single measuring value sender and at least two measuring value transmitters;
  said two measuring value transmitters being mounted so as to be exactly uniformly distributively arranged at the circumference of the rotatable table and cooperating with said measuring value sender for controlling the rotation of the rotatable table through an angle of exactly 180°;
further means for measuring the starting position of the first slide in relation to the work spindle and for enabling adjustment of the rotatable table axis in relation to the work spindle axis so as to intersect at a common intersection point;
said further measuring means comprising:
  a measuring value sender arranged on the second slide;
  a stationary measuring value transmitter cooperating with said measuring value sender on the second slide;
  a measuring value transmitter arranged on the first slide; and
  a stationary measuring value sender cooperating with said measuring value transmitter arranged on the first slide, for measuring displacement of the work spindle axis in the X-direction and using such measurement result for the purpose of enabling displacment of the first slide through a measured amount defined by said measurement result in the X-direction, so that the rotatable table axis and the work spindle axis again intersect at the common intersection point.

* * * * *